US006987846B1

(12) United States Patent
James

(10) Patent No.: US 6,987,846 B1
(45) Date of Patent: Jan. 17, 2006

(54) SYSTEM AND METHOD OF CHANGING ENTITY CONFIGURATION INFORMATION WHILE AUTOMATICALLY MONITORING AND DISPLAYING SUCH INFORMATION IN A CALL CENTER

(75) Inventor: Eric James, Elgin, IL (US)

(73) Assignee: Rockwell Electronic Commerce Technologies, LLC, Wood Dale, IL (US)

(*) Notice: Subject to any disclaimer, the term of this patent is extended or adjusted under 35 U.S.C. 154(b) by 384 days.

(21) Appl. No.: 09/584,306

(22) Filed: May 31, 2000

(51) Int. Cl.
H04M 3/42 (2006.01)
(52) U.S. Cl. ............................ 379/201.06; 379/265.03; 379/265.04; 379/913
(58) Field of Classification Search ........... 379/201.06, 379/913, 265.03, 265.04
See application file for complete search history.

(56) References Cited

U.S. PATENT DOCUMENTS 5,465,286 A * 11/1995 Clare et al. ............... 379/32.04
5,493,692 A * 2/1996 Theimer et al. ........... 455/26.1
5,742,675 A * 4/1998 Kilander et al. ....... 379/266.09
5,822,418 A * 10/1998 Yacenda et al. ....... 379/201.07
6,026,153 A * 2/2000 Fuller et al. ................ 379/200
6,268,872 B1 * 7/2001 Matsuda et al. ............ 345/473
6,577,726 B1 * 6/2003 Huang et al. .......... 379/265.02

* cited by examiner

Primary Examiner—Harry S. Hong
Assistant Examiner—Quynh H. Nguyen
(74) Attorney, Agent, or Firm—Welsh & Katz, Ltd.

(57) ABSTRACT

A system and method of changing entity configuration information in a call center is disclosed. By automatically monitoring entities in a call center, selecting an entity in the call center, and modifying configuration information of the selected entity, keeping track of entities in a call center is automated. Agents and consoles are examples of entities monitored in the call center. When agents or consoles change physical location, the electronic floor plan is automatically updated to reflect the new physical location information for the agents and consoles. Further, a supervisor of a call center can change entity configuration information by selecting an entity on the electronic floor plan.

51 Claims, 5 Drawing Sheets

SYSTEM AND METHOD OF CHANGING ENTITY CONFIGURATION INFORMATION WHILE AUTOMATICALLY MONITORING AND DISPLAYING SUCH INFORMATION IN A CALL CENTER

FIELD OF THE INVENTION

This invention relates to communications systems and, more particularly, to call centers.

BACKGROUND OF THE INVENTION

Communications systems with call centers are known. Such systems are typically used as a means of distributing telephone calls among a group of call center agents of an organization. As calls are directed to the organization from the public switch telephone network (PSTN), the communications system directs the calls to its call center agents based upon some algorithm. For example, a communications system such as an automatic call distributor (ACD), a public branch exchange (PBX), or a central office exchange service (centrex) may recognize a call target based upon an identity of an incoming trunk line and route the call accordingly.

In call centers where many calls are received and handled by many call center agents, the call center may contain a large number of agents. Agents are responsible for servicing customers. Call center agents may provide product support, take sales orders, and handle inquires. In essence, the call center agents provide the wide array of services that the companies that use them require. Thus, the effectiveness and efficiency of a call center depends on the call center agents. Call center supervisors manage call center agents, including scheduling their tasks and duties, and are responsible for monitoring their whereabouts.

To manage the call center efficiently, it is important for a call center supervisor to have ready access to the location of the call center agents. Currently, monitoring of the call center is performed manually by a paper or electronic floor plan image of the call center depicting the consoles that the agents sit at. To monitor the whereabouts of agents, tags representing agents are placed on the floor plan in the console position occupied by the agent.

Such manual solutions may be inaccurate and may misrepresent an agent's physical location. For example, many call centers operate in hotdesking mode where agents sit at different seats according to availability and preference on a shift by shift basis. Thus, the floor plan may not represent the current agent and console locations. When an agent moves from one console to another, the call center supervisor must make note of the change by moving the tag representing the agent either on the paper or electronic floor plan. This requires the supervisor to constantly update the floor plan. If the supervisor looses track of agent positions, then some consoles identified as occupied may be mismarked. By not adequately tracking agents or consoles, the call center becomes underutilized and inefficient. Also, by being unaware of agents' whereabouts, the call center supervisor is unable to estimate the call center's capability.

Further, even if the supervisor where to maintain an accurate floor plan, the supervisor is not able to reassign agents and make other configuration changes from the supervisor's desk. The supervisor must physically walk over to an agent's console and re-assign or re-configure the agent's console. Having the supervisor walk to each agent's console and perform the necessary changes is time consuming and inefficient.

The existing method of monitoring physical locations of call center agents and consoles of communications systems requires the supervisor to manually track agents and consoles. As a consequence, many agents may be undetected or many unused consoles may be unused, and thereby, the quality of service provided by the call center may degrade. Further, the supervisor must physically walk to each and every console to perform the necessary changes to console configuration so that the call center is optimally performing. Accordingly, a need exists for a better way of changing agent and console information while automatically monitoring and displaying such information in a call center.

SUMMARY

The present invention, accordingly, provides a system and method of changing entity configuration information that overcomes or reduces the disadvantageous and limitations associated with prior agent monitoring methods and systems. Illustrated embodiments reduce the disadvantage of manually tracking agents and consoles in a call center by automatically monitoring entities in a call center, selecting an entity in the call center, and modifying configuration information of the selected entity. An electronic floor plan that depicts the locations of the entities, displays the entity configuration information and is automatically updated when changes occur is disclosed. In an exemplary embodiment, call center supervisors are able to view accurate physical location information for call center agents and consoles on a two-dimensional or three-dimensional electronic floor plan. Further, the call center supervisors are able to change entity configuration information by selecting an entity from the electronic floor plan.

BRIEF DESCRIPTION OF THE DRAWINGS

The foregoing advantageous features of the invention will be explained in greater detail and others will be made apparent from the detailed description of the preferred embodiment of the present invention which is given with reference to the several figures of the drawing, in which.

DETAILED DESCRIPTION

Figure 1:
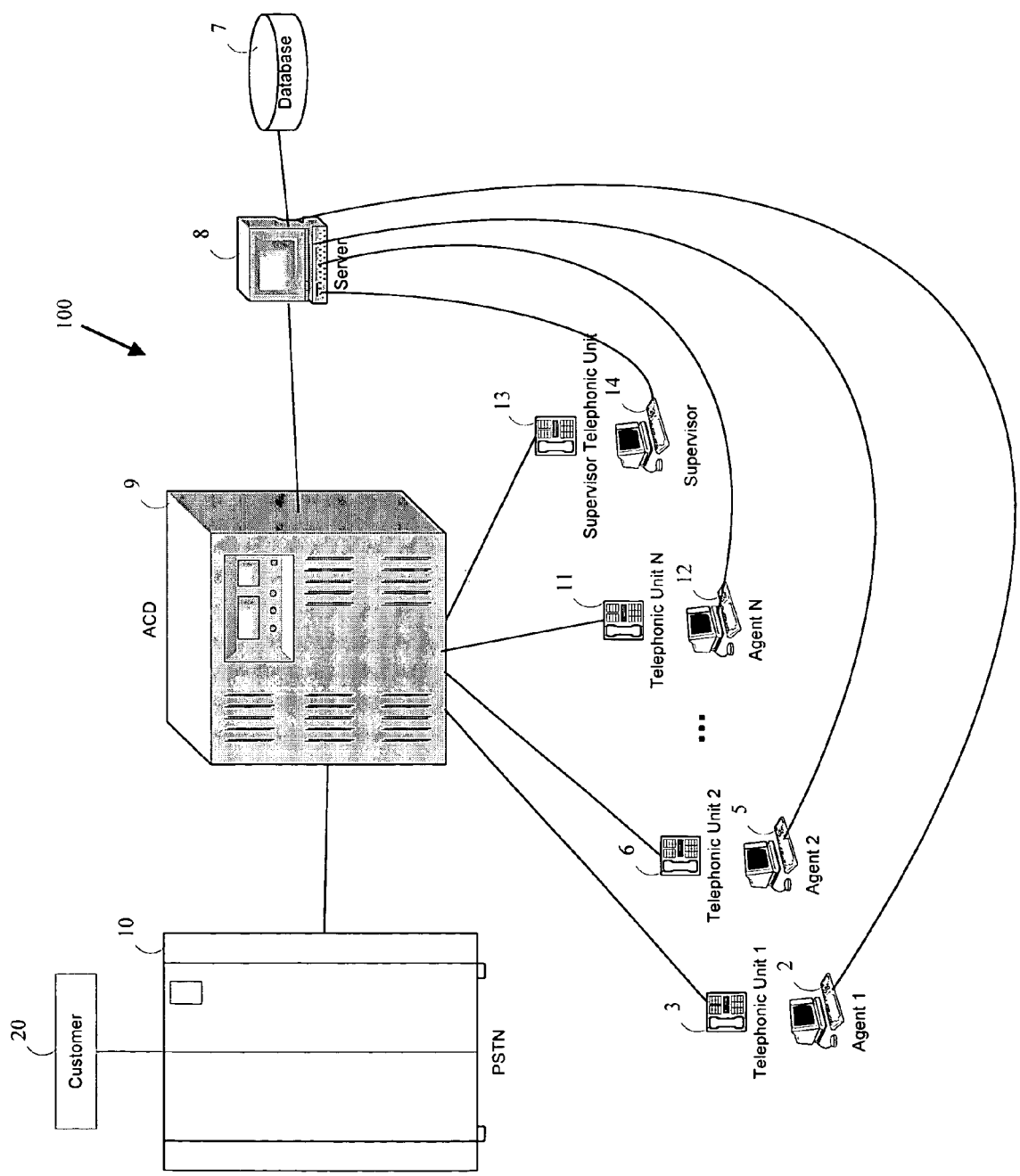
FIG. 1 is a simplified functional block diagram of the automatic call distribution system in accordance with an illustrated embodiment of the invention.

Shown in FIG. 1 is a communications system 100 shown in a context of use. The communications system 100 functions to selectively and automatically interconnect a caller 20 calling through the public switched telephone network (PSTN) 10 to one of a number of agent telephones 1–N (3, 6, or 11) where N may be a preselected number greater than one. Although the communications system 100 is described with reference to an automatic call distributor (ACD), a PBX or centrex system may also be used in place of the ACD. Further, implementing a call center with any of these switching systems is considered to be equivalent and variations will not be discussed further. For a more detailed discussion of automatic call distributors, reference may be made to U.S. Pat. No. 5,268,903 to Jones et al. entitled "Multichannel Telephonic Switching Network With Different Signaling Formats and Connect/PBX Treatment Selectable For Each Channel", issued Dec. 7, 1993; U.S. Pat. No. 5,140,611 to Jones et al. entitled "Pulse Modulated Self-Clocking and Self-Synchronizing Data Transmission and Method for a Telephonic Communication Switching System", issued Aug. 8, 1992 and U.S. Pat. No. 5,127,004 to Lenihan et al. entitled "Tone and Announcement Message Code Generator for a Telephonic Switching System and Method", issued Jun. 30, 1992.

Further, although the present invention is described in reference to the PSTN 10, a packet-switched voice network or other equivalent network where voice calls are relayed to a call center may be used. For example, where voice calls are transmitted over a global network, such as the Internet using Internet Protocol (IP) a packet-switched communications network may be used to implement the system of transmitting the call.

In addition to the agent telephone (3, 6, or 11), the agent has a computer workstation consisting of a terminal and an input device, such as a keyboard or mouse. The agent telephone (3, 6, or 11), terminal and input device are collectively termed a "console." A console is one type of physical entity in a call center. The term entity is used to refer to physical objects in a call center. For example, it may refer to an agent, console, supervisor, printer, or facsimile. In the illustrated embodiment, the term entity refers to a call center agent or a call center console; however, other physical objects may be monitored and displayed as described by the present invention.

In addition to the agent telephones (3, 6, 11), the ACD 9 also interfaces with a server computer 8. The server 8 functions to provide agent workstations (2, 5, 12) and supervisor workstation 14 with information from the ACD 9 and a database 7. For example, as calls are received from the PSTN 10, call associated information (e.g., ANI, DNIS, etc.) may be delivered to the agent along with the call. The database 7 maintains performance statistics, customer information, and dial lists of the ACD 9 system. Server computer 8 may relay statistics and performance information maintained in database 7 to the supervisor workstation 14.

In accordance with an embodiment of the present invention, a method for changing entity configuration information in a call center comprising the steps of:

(a) automatically monitoring entities in a call center, (b) selecting an entity in the call center, and (c) modifying configuration information of the selected entity. The step of automatically monitoring entities is further described below. The step of selecting an entity functions to provide the supervisor with a way to focus on an entity in the call center without having to physically walk over to the entity. In an exemplary embodiment, selecting an entity is accomplished by placing a selection device, such as a mouse, over a pictorial image of the entity and double clicking on the image. Selection may also be performed by the use of a pen-based or voice recognition device that performs the same function. The step of modifying entity configuration information functions to allow the supervisor to change parameters or data associated with a specific entity without having to walk over to the entity and make those changes. This may be accomplished by typing in configuration information via a keyboard or via selection of configuration parameters by the mouse.

In an exemplary embodiment, entity configuration information includes data such as staff ID, class of service, agent group, directory number, supervisor staff ID, schedule adherence threshold group, secondary agent group, agent information group, message queue, major class, and name. For example, agent Bob having a staff ID of 1111 sitting at console 1234 would have the following related configuration information.

| Configuration Name | Description | Value |
| --- | --- | --- |
| staff ID | Sign-in Number associated with a Person | 1111 |
| class of service | AGENT, SUPV, MASTER, MAINT, VRU, VMAIL, FAX, PHONE, or TRUNK | AGENT |
| agent group | Sales, Service, Management, etc. | Widget Sales Telephone Lines, 1–200 |
| directory number | Staff member's phone extension | 5455 |
| supervisor staff ID | Supervisor for Staff | Carol Smith |
| schedule adherence threshold group | Associates Staff with certain thresholds | 1 |
| secondary agent group | Sales, Service, Management, etc. | Gizmo Sales Telephone Lines, 1–220 |
| agent information group | Collection of organized agents, LINRs, or VRUs | |
| message queue | ACD mail message queue to which agent is assigned | 0 |
| major class | Type of staff, e.g. AGENT, SUPV, MASTER, and MAINT | AGENT |
| name | Name of staff | Bob Jones |
| console | Number of physical console unit | 1234 |

Figure 2:
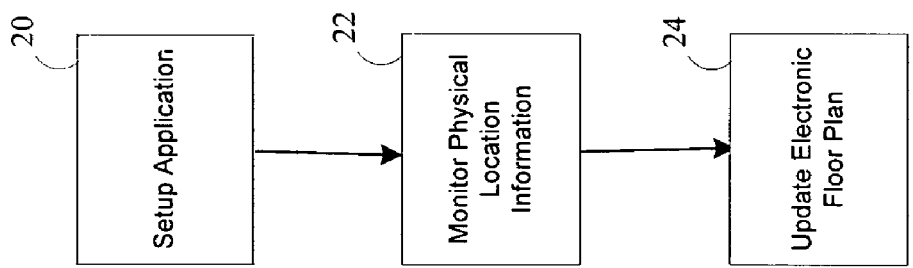
FIG. 2 is a simplified flow chart of the method used by the system of FIG. 1.

The step of automatically monitoring entities functions to provide an updated electronic floor plan of the call center to the supervisor of the call center. The step further comprises the steps of: (a) monitoring physical location information of entities to provide an electronic floor plan (see block 22 of FIG. 2), and (b) updating the electronic floor plan to provide and reflect a change in physical location information of the entities (see block 24). Physical location information includes x, y, and z Cartesian coordinates, latitude and longitude meridians, or radius vector and angle. As an example, referring now to FIG. 4, console 60 may be referred to by its x, y, and z Cartesian coordinates as console (2, 2, 4). Further, the Cartesian coordinates are used to graphically describe the location of console 60 on a two-dimensional user interface.

The step of monitoring physical location information of entities functions to provide an automatic trigger for changes in the physical location information. Monitoring means detecting physical location information for each entity in the system and noting changes when an entity moves. The step of updating an electronic floor plan means providing a call center supervisor with current entity configuration information regarding the entity within call center. Updating an electronic floor plan requires retrieving the recorded physical location information, translating the recorded physical location information into graphical form, and drawing the graphical form on an electronic floor plan.

In one embodiment the physical location information is stored in the database 7 without meaning. The application that uses the physical location information dictates the meaning of the coordinates. For example, in a VRML representation of the call center, the physical location information is represented in Cartesian x, y, z coordinates. A call center console projected onto a 2-dimensional device in the direction of the positive z axis has a positive x axis to the right and a positive y axis up.

Figure 3:
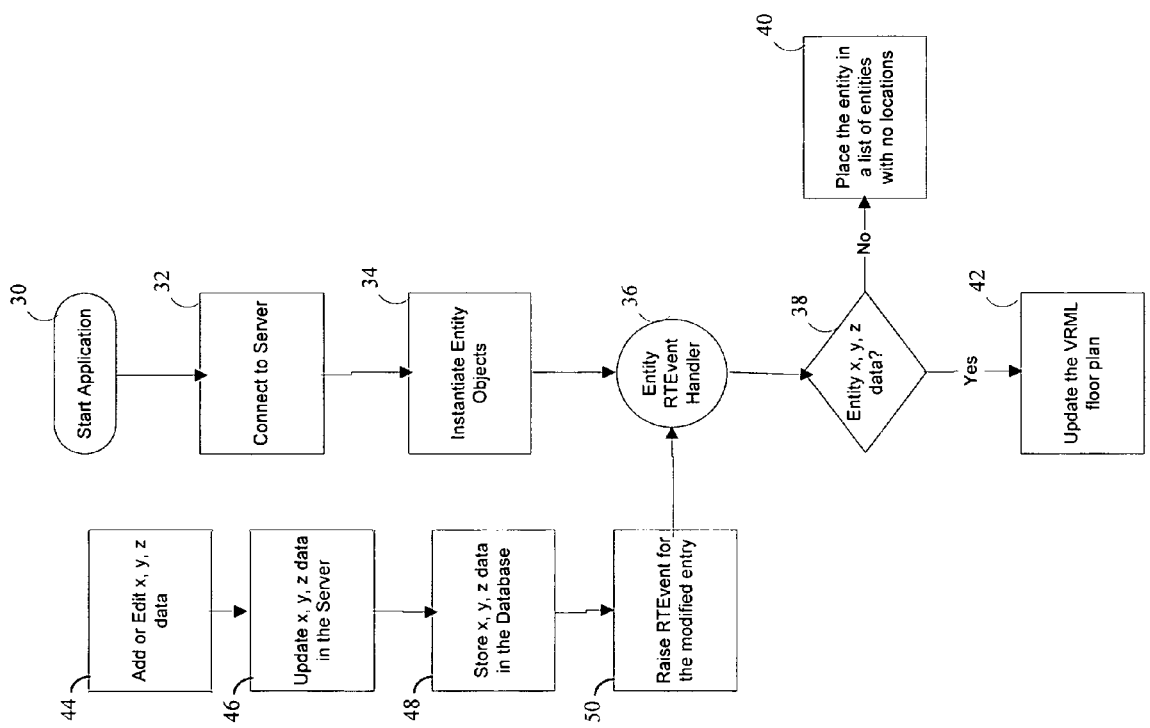
FIG. 3 is a simplified flow chart of an embodiment of the method disclosed in FIG. 2.

Referring now to FIG. 3, as an application session (see block 30) begins on the supervisor workstation 14, the supervisor workstation 14 connects to the server computer 8 (see block 1). In an alternative embodiment, an application session may begin by connecting directly to the ACD 9. Next, entity objects are allocated and initialized to produce defined versions on the supervisor workstation 14 (see block 34). This step makes memory available on the supervisor workstation 14 for the physical location information of the entities in the call center.

Further, an event handler routine is initiated to execute whenever agent physical location information is changed (see block 36). The event handler runs in the background on the supervisor workstation 14 and is triggered by a change in x, y, z physical location information. If a change does occur, then the event handler executes software to update the electronic floor plan (see blocks 38–42).

When a new entity or an existing entity is modified (see block 44), the new x, y, z physical location information is updated in the server computer 8 (see block 46). For example, when an agent moves from console 51 to console 52, the agent logs off console 51 and logs on to console 52. Thus, the agent's physical location has changed from (0, 3, 4) to (1, 3, 4). In one embodiment, the new physical location information (1, 3, 4) is stored in the server computer 8. Then, the new x, y, z physical location information is copied to the database 7 (see block 48). In the above example, the new physical location information for the agent sitting at console 52 is (1, 3, 4) and is stored in the database 7.

In one embodiment, an application running on the supervisor workstation 14 may have a look-up table that keeps track of relationships between agents and consoles. In such an embodiment, the application running on the supervisor workstation would copy the physical location information from the server computer 8 or from the database 7 and maintain a look-up table of agents and consoles.

After the change is made in the database, Entity RTEvent Handler is triggered (see block 50) to perform an update of the electronic floor plan (blocks 38–42). Triggering or raising RTEvent for the new physical location information (see block 50) requires sending a signal to inform RTEvent that a change has occurred. When RTEvent receives the signal, it takes specified actions, namely updating the electronic floor plan (see blocks 38–42).

In an alternative embodiment, the new physical location information is compared with the physical location information in the database 7 before RTEvent Handler was triggered. If the two are the same, then RTEvent Handler is not triggered. For example, the supervisor may delete an agent from the system and then immediately add the same agent to the same console. In such a situation, there is no need to redraw the electronic floor plan to reflect the change.

Updating of the electronic floor plan is performed by reading the recorded physical location information, translating the recorded physical location information to graphical form, and drawing the graphical form on the electronic floor plan. Reading the recorded physical location information occurs when RTEvent is triggered (see block 36). Translating the recorded physical location information occurs by first verifying that the information contains x, y, z Cartesian coordinates (see block 38). If it does not, then the entity is placed in a list of entities with no location and displayed on the electronic floor plan as not having a location (see block 40). If the information contains x, y, z information, then the electronic floor plan is drawn to reflect this change (see block 42). In an exemplary embodiment, a symbol representing an agent is placed at the console position that the agent is sitting at. For example, in FIG. 4, a graphical symbol of a man in a circle is used to depict the agent's occupied position. However, the electronic floor plan may be of any form reflecting the physical location of entities in the call center.

Figure 4:
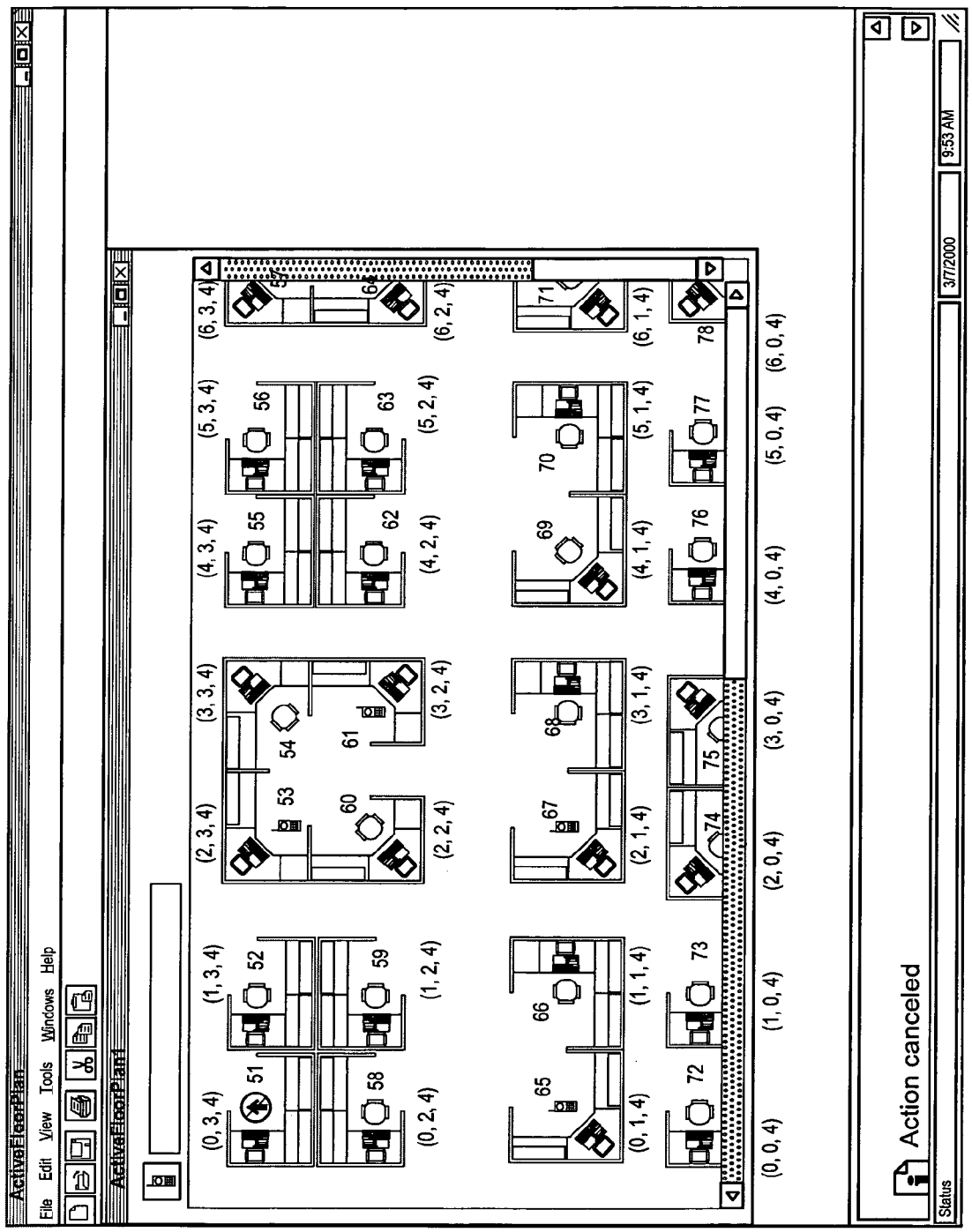
FIG. 4 is a diagram depicting a two-dimensional electronic floor plan used by the system of FIG. 1.

Under an illustrated embodiment, the electronic floor plan may be drawn in a two-dimensional projection of the call center. Referring now to FIG. 4, each console (51–78) is displayed on the floor plan. The background image of the call center is predefined and may be specified as a rectangular floor plan. Further, the agent who is sitting at a specific console is displayed on the electronic floor plan. FIG. 4 is a bitmap image of the floor plan. However, alternative embodiments may include vector or object oriented graphical images of the floor plan.

Figure 5:
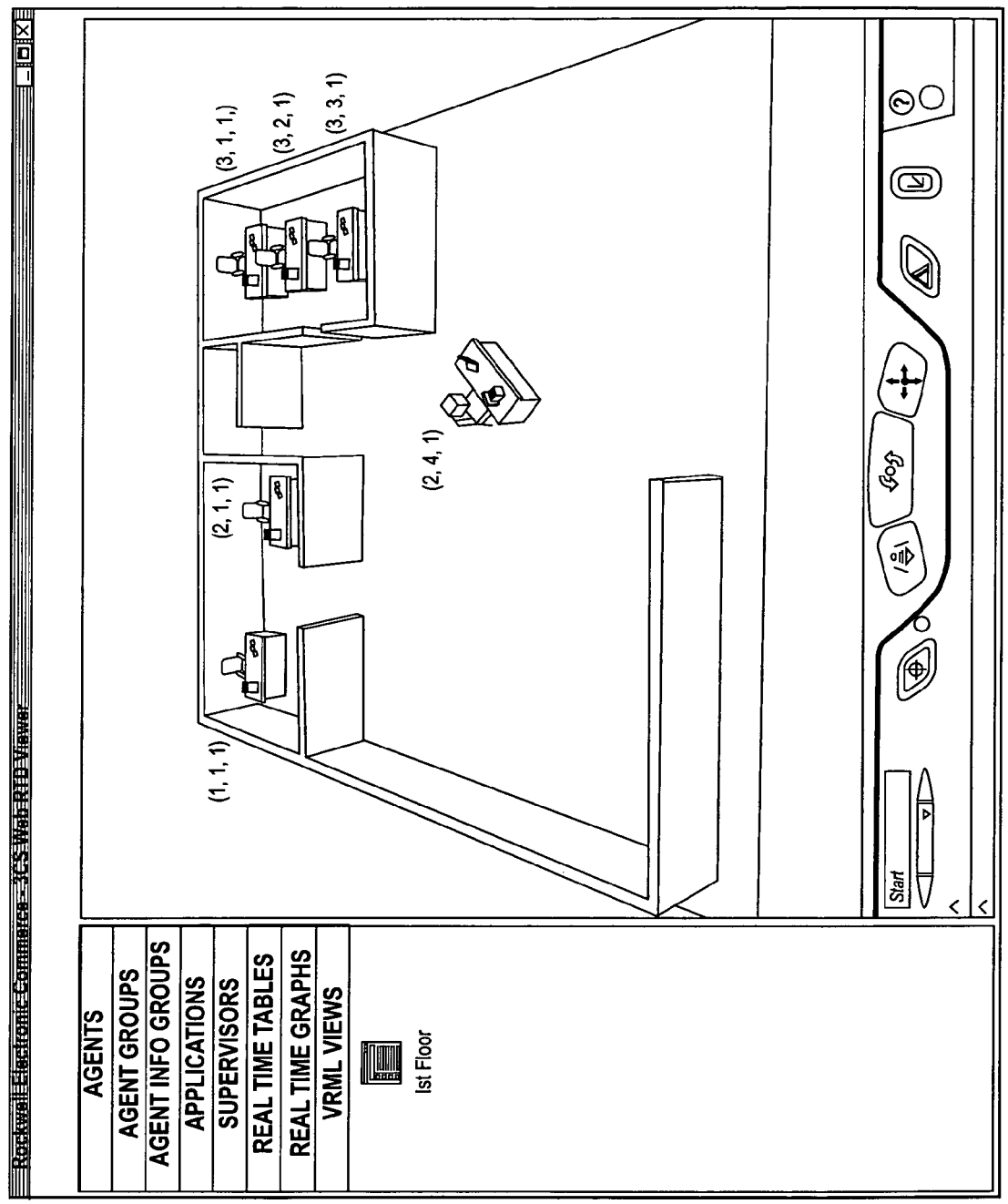
FIG. 5 is a diagram depicting a three-dimensional electronic floor plan used by the system of FIG. 1.

Under another illustrated embodiment, the electronic floor plan may be drawn in a three-dimensional projection of the call center. A three-dimensional floor plan representing a specific call center may be created using virtual reality modeling language (VRML) and JavaScript code. By accessing the physical location information in either the server computer 8 or the database 7, the VRML electronic floor plan is updated with call center agent and console information. The VRML specification provides for taking Cartesian coordinates and performing a visual representation. Referring now to FIG. 5, a VRML image of a call center with six consoles is displayed. Further, the agent who is sitting at a specific console is displayed on the electronic floor plan. Alternative embodiments may include other three-dimensional modeling objects.

In an alternative embodiment, the method may employ learning as a method of increasing the detection of changes in physical location. The method recognizes and learns agent location pattern regularities that appear over time. For example, agents assigned to consoles (55–60) regularly break for lunch during the noon hour. The method may recognize this pattern and learn that during such a time, the location of the agent is in the break room. The ability to predict physical location information may allow the call center supervisor to better predict agent absences and more efficiently manage the call center.

At the end of an application session, the physical location information may be copied to the database 8 for use at a future date. Further, the physical location information may be archived so that the call center supervisor may perform historical analysis of the data to determine efficiencies of the call center and more particularly, call center agents.

A specific embodiment of a system and method of monitoring entities according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

What is claimed is:

1. A method of changing entity configuration information in a call center comprising the steps of:
    monitoring a database of the call center by an application within a supervisors workstation for log ons and log offs by entities of the call center to identify consoles being used by the entities;
    detecting log ons and log offs of the entities with respect to the call center by the application;
    modifying configuration information of the entities within a lookup table by the application based upon the detected log ons and log offs of the entities;
    monitoring physical location information of entities within the lookup table by an event handler within the supervisors workstation based upon the configuration information within the lookup table to provide an electronic floor plan;
    displaying the electronic floor plan containing pictorial images of the entities by the event handler on the workstation of the supervisor;
    automatically updating the electronic floor plan by the event handler to provide and reflect a change in physical location information of the entities based upon the automatic monitoring of the log ons and log offs of the entities;
    the supervisor selecting a pictorial image of an entity of the entities displayed on the electronic floor plan; and
    displaying entity configuration information of the selected entity on the supervisors workstation in response to the selection.

2. The method of changing entity configuration information as in claim 1 wherein physical location information includes Cartesian coordinates, latitude and longitude meridians, and radius vector and angle.

3. The method of changing entity configuration information as in claim 1 wherein entities includes call center agents, consoles, printers, and facsimile machines.

4. The method of changing entity configuration information as in claim 1 wherein the electronic floor plan includes a bit map image, vector graphics, object oriented graphics, and VRML representation of the call center.

5. The method of changing entity configuration information as in claim 1 wherein the step of monitoring changes further comprises comparing physical location at a second time with physical location at a first time.

6. The method of changing entity configuration information as in claim 1 wherein dating further comprises notifying a supervisor if the physical location information has been changed.

7. The method of changing entity configuration information as in claim 1 wherein the step of monitoring physical location comprises:
    recording physical location information; and
    retrieving the recorded physical location information.

8. The method of changing entity configuration information as in claim 7 wherein the physical location information is entered by a call center user.

9. The method of changing entity configuration information as in claim 7 wherein the physical location information is entered by a server computer.

10. The method of changing entity configuration information as in claim 7 wherein updating further comprises:
    retrieving the recorded physical location information;
    translating the recorded physical location information to graphical form; and
    drawing the graphical form on the electronic floor plan.

11. The method of changing entity configuration information as in claim 10 wherein the recorded physical location information is determined by getting physical location information from a database of call center information.

12. The method of changing entity configuration information as in claim 10 wherein the step of translating includes using a look-up table to create a relationship between physical location information and graphical form.

13. The method of changing entity configuration information as in claim 10 wherein the step of translating further comprises determining whether the recorded physical location information contains proper Cartesian coordinates.

14. The method of changing entity configuration information as in claim 12 wherein proper is information that can be graphically represented on the electronic floor plan.

15. The method of changing entity configuration information as in claim 12 wherein recorded physical location information that is improper is maintained in a list of entities without physical location information.

16. The method of changing entity configuration information as in claim 10 wherein the step of drawing further comprises the step of placing a graphical image on the electronic floor plan.

17. The method of changing entity configuration information as in claim 16 wherein the step of drawing is performed by using bit map drawing tools to produce a two-dimensional image of the electronic floor plan.

18. The method of changing entity configuration information as in claim 16 wherein the step of drawing is performed by using VRML code to produce a three-dimensional image of the electronic floor plan.

19. The method of changing entity configuration information as in claim 1 wherein the step of monitoring further comprises identifying an entity which has physically moved.

20. The method of changing entity configuration information as in claim 1 wherein the electronic floor plan is updated with a prediction of physical location information based upon a history of physical location information.

21. The method of changing entity configuration information as in claim 1 wherein the physical location information is archived and retrieved for later analysis.

22. A system of changing entity configuration in a call center, such system comprising:
    means for monitoring a database of the call center for log ons and log offs by entities of the call center to identify consoles being used by entities of the call center, said identified consoles being used by the means for monitoring to determine physical location information of entities of the call center based upon the log ons and log offs of the entities with respect to the call center to provide an electronic floor plan;

means for producing defined versions of the electronic floor plan containing pictorial images of the entities on a supervisor workstation;

means for updating the electronic floor plan to provide and reflect the changes in physical location information of the entities based upon the log ons and log offs of the entities means on the supervisors workstation for selecting a pictorial image of an entity of the entities; and means for displaying entity configuration information of the selected entity on the supervisors workstation in response to selection of the entity.

23. The system of changing entity configuration as in claim 22 wherein entities includes call center agents, consoles, printers, and facsimile machines.

24. The system of changing entity configuration as in claim 22 wherein the electronic floor plan includes a bit map image, vector graphics, object oriented graphics, and VRML representation of the call center.

25. The system of changing entity configuration as in claim 22 further comprising means for comparing physical location at a second time with physical location at a first time.

26. The system of changing entity configuration as in claim 22 wherein the means for updating further comprises means for notifying a supervisor if the physical location information has been changed.

27. The system of changing entity configuration as in claim 22 wherein the means for monitoring physical location information further comprises: means for recording physical location information; and means for retrieving the physical location information.

28. The system of changing entity configuration as in claim 27 wherein the physical location information is entered by a call center user.

29. The system of changing entity configuration as in claim 27 wherein the physical location information is entered by a server computer.

30. The system of changing entity configuration as in claim 27 wherein the means for updating further comprises:

means for reading the recorded physical location information;

means for translating the recorded physical location information to graphical form; and means for drawing the graphical form on the electronic floor plan.

31. The system of changing entity configuration as in claim 30 wherein the physical location information is stored in a database of call center information.

32. The system of changing entity configuration as in claim 30 wherein the means for reading further comprises means for retrieving physical location information from a database of call center information.

33. The system of changing entity configuration as in claim 30 wherein the means for translating includes a look-up table of relationships between physical location information and graphical form.

34. The system of changing entity configuration as in claim 30 wherein the means for translating further comprises means for determining whether the recorded physical location information contains proper Cartesian coordinates.

35. The system of changing entity configuration as in claim 33 wherein proper is information that can be graphically represented on the electronic floor plan.

36. The system of changing entity configuration as in claim 33 wherein recorded physical location information that is improper is maintained in a list of entities without physical location information.

37. The system of changing entity configuration as in claim 33 wherein the means for drawing further comprises means of placing a graphical image on the electronic floor plan.

38. The system of changing entity configuration as in claim 33 wherein the means for drawing includes bit map and VRML drawings tools.

39. The system of changing entity configuration as, in claim 22 wherein the means for monitoring further comprises means for identifying an entity which has physically moved.

40. The system of changing entity configuration as in claim 22 further comprising means for predicting physical location information based upon a history of physical location information.

41. The system of changing entity configuration as in claim 22 further comprising means for storing archived physical location information.

42. The system of changing entity configuration as in claim 41 further comprising means for retrieving the archived physical location information.

43. A system of changing entity configuration in a communication system, such system comprising:

an entity monitor which monitors a database of the communication system for log ons and log offs by entities of the call center to identify consoles being used by the entities, said identified consoles being used by the entity monitor to determine physical location information based upon the log ons and log offs of the entities with respect to the communication system to provide an electronic floor plan that contains pictorial images of the entities;

a supervisors workstation that displays the electronic floor plan; and an informer within the supervisors workstation that automatically updates the electronic floor plan displayed on the supervisors workstation to provide and reflect changes in physical location information of the entities based upon the log ons and log offs of the entities;

a selection device for selecting a pictorial image of an entity of the entities displayed on the electronic floor plan; and an entity configuration information table that is displayed on the supervisors workstation in response to selection of the pictorial image of the entity.

44. The system of changing entity configuration as in claim 43 wherein the call monitor comprises a programmable computer.

45. The system of changing entity configuration as in claim 43 wherein entities includes call center agents, consoles, printers, and facsimile machines.

46. The system of changing entity configuration as in claim 43 wherein the electronic floor plan includes a bit map image, vector graphics, object oriented graphics, and representation of the call center.

47. The system of changing entity configuration as in claim 43 wherein the entity monitor further comprises an evaluator which compares physical location at a second time with physical location at a first time.

48. The system of changing entity configuration as in claim 43 wherein the informer further comprises a notifier which alerts a supervisor if the physical location information has changed.

49. The system of changing entity configuration as in claim 43 wherein the entity monitor further comprises:

a recorder for storing physical location information; and a retriever for getting the stored physical location information.

50. The system of changing entity configuration as in claim 49 wherein the informer further comprises:
   a reader which retrieves the recorded physical location information;
   a translator for relating the recorded physical location information to graphical form; and
   a drawer which places the graphical form on the electronic floor plan.

51. The system of changing entity configuration as in claim 50 wherein the translator includes a look-up table of relationships between physical location information and graphical form.

* * * * *